(12) United States Patent
Tiberio, Jr.

(10) Patent No.: US 8,307,054 B2
(45) Date of Patent: Nov. 6, 2012

(54) SYSTEMS AND/OR METHODS FOR LOCATION TRANSPARENT ROUTING AND EXECUTION OF PROCESSES

(75) Inventor: Robert L. Tiberio, Jr., Sutton, MA (US)

(73) Assignee: Software AG, Darmstadt (DE)

( * ) Notice: Subject to any disclaimer, the term of this patent is extended or adjusted under 35 U.S.C. 154(b) by 930 days.

(21) Appl. No.: 11/896,312

(22) Filed: Aug. 30, 2007

(65) Prior Publication Data

US 2009/0063664 A1 Mar. 5, 2009

(51) Int. Cl.
*G06F 15/177* (2006.01)
(52) U.S. Cl. ........................ 709/222; 709/220
(58) Field of Classification Search .......... 719/313–317, 719/330–332; 709/217–219, 220–222, 238
See application file for complete search history.

(56) References Cited

U.S. PATENT DOCUMENTS

| 6,665,861 | B1* | 12/2003 | Francis et al. ................ 717/120 |
| 7,496,687 | B2* | 2/2009 | Griffin et al. ................. 709/249 |
| 7,539,996 | B2* | 5/2009 | Nomura et al. ............... 719/313 |
| 7,747,474 | B2* | 6/2010 | Miloslavsky et al. .......... 705/26 |
| 7,814,192 | B2* | 10/2010 | Kumar .......................... 709/223 |
| 2002/0116248 | A1 | 8/2002 | Amit et al. |
| 2002/0116362 | A1* | 8/2002 | Li et al. .......................... 707/1 |
| 2002/0144256 | A1* | 10/2002 | Budhiraja et al. ............ 717/174 |
| 2003/0097286 | A1* | 5/2003 | Skeen .............................. 705/7 |
| 2003/0097457 | A1 | 5/2003 | Saran et al. |
| 2003/0195762 | A1* | 10/2003 | Gleason et al. ................. 705/1 |
| 2004/0254993 | A1* | 12/2004 | Mamas .......................... 709/206 |
| 2006/0004855 | A1* | 1/2006 | Ivanova et al. ............ 707/103 Y |
| 2006/0095274 | A1* | 5/2006 | Phillips et al. ................... 705/1 |
| 2006/0248189 | A1 | 11/2006 | Jerrard-Dunne et al. |
| 2008/0281947 | A1* | 11/2008 | Kumar .......................... 709/220 |
| 2010/0325496 | A1* | 12/2010 | Kumar ............................ 714/57 |

FOREIGN PATENT DOCUMENTS

EP 1 528 710 5/2005

OTHER PUBLICATIONS

Stephen A. White: Introduction to BPMN. IBM Corporation, 2004.*

(Continued)

*Primary Examiner* — Brendan Higa
(74) *Attorney, Agent, or Firm* — Nixon & Vanderhye P.C.

(57) ABSTRACT

The example embodiments disclosed herein relate to networks and, more particularly, to systems and/or methods that enable processes to be routed and/or executed in a distributed, location transparent manner. A process engine for use across instances of a service-oriented integration server is provided to a network having a messaging layer. The process engine executes a process in accordance with a process model defined at design time. Each instance of the process engine comprises runtime artifacts such as deployable units of executable logic; a publishing service for publishing a process transition document (PTD) that includes routing data as a part of the message itself; a subscription service for subscribing to the PTDs to be routed to the corresponding instance of the process engine; and a filtering service for filtering other PTDs published to the messaging layer. The messaging layer includes a first queue to process PTDs that trigger new process instances, and a second queue to accommodate transitions between steps of the process model. After a step in the process model is executed, the publishing service publishes a new PTD to cause a next step in the process model to be executed.

40 Claims, 12 Drawing Sheets

OTHER PUBLICATIONS

"BusinessWare—Business Process Integration for SOA & Event-Driven Architectures", Dec. 06'. Available at http://www.vitria.com/pdf/Brochure-BusinessWare-SOA.pdf.*

"Java Message Service API Tutorial", Kim Haase, Sun Microsystems, Inc., Aug. 2001, pp. 1-278.

"Guarantee Inter-Enterprise Message Delivery Using JMS", Gopalan Suresh Raj, Java Report, SIGS Publications, New York, vol. 5, No. 8, Aug. 2000.

"JMS and CORBA Notification Interworking", Steve Trythall, Internet Citation, Dec. 12, 2001.

* cited by examiner

US 8,307,054 B2

SYSTEMS AND/OR METHODS FOR LOCATION TRANSPARENT ROUTING AND EXECUTION OF PROCESSES

FIELD OF THE INVENTION

The example embodiments disclosed herein relate to networks and, more particularly, to systems and/or methods that enable processes to be routed and/or executed in a distributed, location transparent manner. The processes for routing and/or execution with certain example embodiments of certain example embodiments may relate to business processes, and JMS messaging may be used in connection with certain example implementations. Thus, there may be a reduced need for specific knowledge about the location of where the steps of a business process execute and/or the physical infrastructure that comprises the resources employed by the enterprise, on the part of a person authoring a business process and/or the process engine itself.

BACKGROUND AND SUMMARY OF EXAMPLE EMBODIMENTS OF THE INVENTION

Business processes often interact with many different back-end application systems and groups of people that typically are distributed across many geographies. For example, an enterprise typically has many facilities, with each hosting applications used by workers that have specific tasks to be performed in a given facility. Rarely is there a single central data center that provides all of the computing resources needed for a business to function.

One approach for providing resources across various geographies has involved decentralized distributed computing. Decentralized distributed computing, in general, relies on wide area networking to provide connectivity between different facilities. Unfortunately, wide area networking typically has reduced bandwidth, latency, and is more costly to maintain than local area networking.

Accordingly, it typically is more efficient and reliable to process data locally, e.g., on a local area network (LAN), than across a wide area network (WAN). But this processing arrangement creates a technical challenge for enabling a business to realize the benefits of Business Process Management (BPM) when an intimate knowledge of the physical infrastructure of its enterprise is lacking or completely absent.

The concept of process orchestration typically employs the use of an orchestration engine. Commercially available BPM orchestration engines are typically designed such that a business process's state is managed in a single location by a single orchestration engine. This implies that orchestrating services that interact with remote applications require a stable and reliable wide area network that has sufficient bandwidth and redundancy to handle the loading factors that often occur when BPM systems handle large volumes of data.

Furthermore, significant knowledge of the physical infrastructure within an enterprise often is not fully understood by business users who rely upon BPM process modeling as a methodology to create business-oriented solutions in a rapid fashion. Unfortunately, current Business Process Management Suite (BMPS) products that are commercially available do not remove the technicalities associated with how a process will be deployed and execute at the time the process is defined.

Thus, it will be appreciated that there is a need in the art for techniques that improve process routing and/or execution. Moreover, there also is a need in the art for techniques that provide location transparent process execution, for example, so that data and services may be accessed across a plurality of geographies effectively, efficiently, and/or with a reduced knowledge of the exact technical makeup of the enterprise and/or its network architecture.

One aspect of certain example embodiments of this invention relates to location transparent distributed process execution as enabled by a suitably configured protocol (e.g., JMS messaging). In certain example embodiments, a process engine may be insulated from the step invocation location by utilizing a queuing/publish-subscribe behavior (e.g., as found in JMS messaging) to execute transitions between process steps.

An aspect of certain example embodiments relates to a BPM process engine capable of distributing the execution of a business process and insulating the location of where process steps execute via a suitable protocol (e.g., via JMS messaging).

Another aspect of certain example embodiments relates to reducing the need for specific knowledge about the location of where steps of a business process execute and/or the physical infrastructure that comprises the resources employed by the enterprise, on the part of a person authoring a business process and/or the process engine itself.

A further aspect of certain example embodiments relates to a reduced need for binding a process to a specific process orchestration engine, thus allowing for the execution of steps to be distributed throughout the enterprise and, in turn, allowing business processes to execute more efficiently in a distributed computing environment.

Yet another aspect of certain example embodiments relates to a significantly horizontally scalable and easy to manage architecture.

In certain example embodiments, a method of configuring a network is provided. A service-oriented integration server including a process engine is provided. At least one physical server is connected to the network. Each said physical server includes an instance of the integration server, and each said instance of the integration server includes an instance of the process engine. A messaging layer for use with the network is provided. At design time, a process is modeled so as to generate a process model, with the process model defining at least one activity associated with the process and at least one step associated with each said activity; and each said activity is assigned to a logical server such that, at deployment time, any executable artifacts needed by an instance of the process engine are generatable. Runtime artifacts are generated from the design time process model. This process includes the steps of generating at least one package from the design time process model, with each said package corresponding to one said logical server and including at least one trigger and a process fragment file, each said trigger being responsible for subscribing to process transition document messages to be routed to the instance of the process engine installed on the corresponding instance of the integration server and for filtering process transition document messages published to the messaging layer, the process fragment file defining only those process steps that are associated with the corresponding logical server; and creating two queues on the messaging layer, with a first queue to process messages that trigger new process instances and a second queue to accommodate transitions between process steps of the process model. Each said package is deployed to a physical server. The package is deployed as a runtime asset for the corresponding instance of the process engine. The process transition document messages are published by the process engine, with each said process transition document message including routing data as a part of the message itself for routing the message. The process engine is configured to provide location transparent routing and process execution via process transition document subscription and filtering.

In certain other example embodiments, there is provided a method of operating a network including at least one physical server and a messaging layer, with each said physical server including an instance of a service-oriented integration server provided to the network, and with each said instance of the integration server including an instance of a process engine. At design time, a process model corresponding to a process to be executed is generated. The process model includes at least one activity associated with the process and at least one step associated with each said activity. Runtime artifacts are generated from the process model. The runtime artifacts comprise at least one deployable unit of executable logic for execution on a corresponding instance of the process engine, a first queue to process process transition documents that trigger new process instances, and a second queue to accommodate transitions between steps of the process model. Each unit of executable logic is deployed to a physical server as a runtime asset for the corresponding instance of the process engine. An instance of the process is initiated according to the process model. A process transition document is published. The process transition document is populated by the process engine with routing data as a part of the message itself for routing the message. Each instance of the process engine subscribes to the process transition documents to be routed to the corresponding instance of the process engine installed on the corresponding instance of the integration server and filters other process transition documents published to the messaging layer. After a step in the process model is executed, a new process transition document is published to cause a next step in the process model to be executed. The process is routed and executed in a location transparent manner.

According to certain example embodiments, a computer-mediated network is provided. A service-oriented integration server includes a process engine configured to provide location transparent distributed execution of a process conforming to a user-defined process model. The process model defines at least one activity associated with the process and at least one step associated with each said activity. A messaging layer for the network is provided. At least one physical server is provided. Each said physical server includes an instance of the integration server. Each said instance of the integration server includes: an instance of the process engine and runtime artifacts generated at design time based on the design time process model. The runtime artifacts include at least one package, with each said package corresponding to one said logical grouping of one or more activities; and two queues provided for the messaging layer, a first queue to process messages that trigger new process instances and a second queue to accommodate transitions between process steps of the process model. Each said instance of the integration server also includes at least one trigger, with each said trigger being responsible for subscribing to process transition document messages to be routed to the instance of the process engine installed on the corresponding instance of the integration server and for filtering process transition document messages published to the messaging layer; and a process fragment file, with the process fragment file defining only those process steps that are associated with the corresponding logical server. The process transition document messages are published by the process engine, with each said process transition document message including routing data as a part of the message itself for routing the message.

According to certain other example embodiments, there is provided a process engine for use across instances of a service-oriented integration server provided to a network having a messaging layer. The process engine is configured to execute a process in accordance with a process model defined at design time so as to include at least one activity associated with the process and at least one step associated with each said activity. Each instance of the process engine comprises runtime artifacts generated from the process model that correspond to a deployable unit of executable logic for execution on the instance of the process engine; a publishing service configured to publish a process transition document, with the process transition document being populated by the process engine with routing data as a part of the message itself for routing the message; a subscription service configured to subscribe to the process transition documents to be routed to the corresponding instance of the process engine installed on the corresponding instance of the integration server; and a filtering service configured to filter other process transition documents published to the messaging layer. The messaging layer includes two queues generated from the design time process model, including a first queue to process transition documents that trigger new process instances, and a second queue to accommodate transitions between steps of the process model. After a step in the process model is executed, the publishing service is configured to publish a new process transition document to cause a next step in the process model to be executed. The process is routed and executed in a location transparent manner.

It will be appreciated that the term "service" corresponds to any suitable combination of hardware, software, firmware, and/or programmed logic circuitry.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Figure 1:
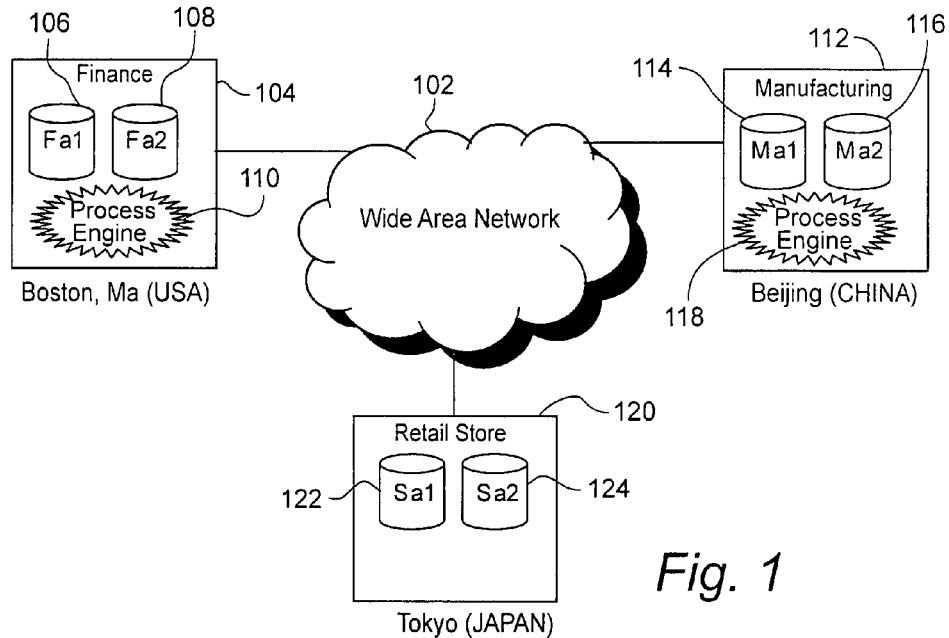
FIG. 1 is a conventional network for providing BPM services for an illustrative enterprise.

One conventional approach for providing BPM services (as shown in FIG. 1 and described in further detail below) comprises a centralized process engine architecture and the binding of a process instance to one of the available engines in the network. Most current commercially available BPM products employ such a centralized engine. The centralized engine maintains the state of all steps within a business process that interact with systems that are widely geographically located. A typical example includes a BPM runtime that relies on the BPEL (Business Process Execution Language) standard as a way to define a runtime model of how various process steps are sequenced. While these products typically allow multiple engines to be configured, the approaches do not perform as well as they could and/or are not as reliable as they could be, for example, because they are subjected to the quality and reliability of the WAN and usually operate synchronously with respect to transitions of steps.

Also, even where multiple process engines can be configured, each process instance is usually bound to a particular engine for the entire lifecycle of that process instance. Furthermore, many such products lack any abstraction in terms of, for example, defining the location of where steps can execute to the model such that intimate knowledge of the enterprise's infrastructure is necessary to be able to deploy a functional business process.

FIG. 1, which is a conventional network for providing BPM services for an illustrative enterprise, helps explain this problem. FIG. 1 shows a factious enterprise that requires the execution of a business process wherein three facilities host applications that interact with a Point-of-Sale (POS) process. In FIG. 1, there is a centrally located WAN 102. The enterprise is spread across three illustrative locations and includes three illustrative activities/facilities. A finance location 104 is shown as being in Boston, Mass. The finance location 104 includes a first financial application 106 and a second financial application 108. A first process engine 110 is bound to the finance location 104. A manufacturing facility 112 is shown as being in Beijing, China. It similarly includes a first manufacturing application 114 and a second manufacturing application 116. A second process engine 118 is bound to the manufacturing location 112. Finally, a retail store location 120 is shown as being located in Tokyo, Japan. The retail store location 120 includes a first retail application 122 and a second retail application 124.

Figure 2:
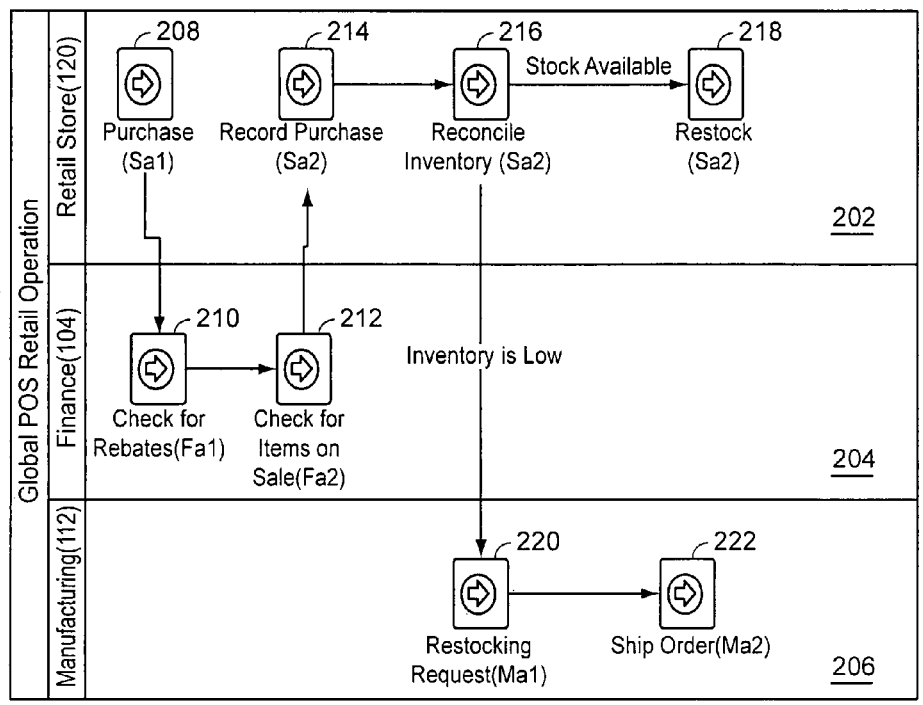
FIG. 2 is an illustrative process diagram for a process taking place over an example global POS retail enterprise operation of FIG. 1.

FIG. 2 is an illustrative process diagram for a process taking place over an example global POS retail enterprise operation of FIG. 1. As will be appreciated from FIG. 2, there are several process steps that interact with systems (retail store location 120, finance location 104, and manufacturing location 112) that are located in different geographies. For this process to execute, it must communicate with resources that are accessible over the WAN 102. Each swim-lane 202/204/206 in this example is used to depict when a transition from one process step to another requires a remote connection to a different facility.

In brief, a purchase 208 is initiated, and the first retail application 122 is invoked at the retail store location 120. The finance location 104 checks for rebates 210 via the first finance application 106 and then checks for items on sale 212 via the second finance application. The purchase is recorded 214 and the inventory is reconciled 216 using the second retail application 124. If stock is available, the second retail application 218 orders restocking 218. If inventory is low, a restocking request 220 is made at the manufacturing location 112 via the first manufacturing application 114, and a restocking order is shipped 222 using the second manufacturing application 116.

Figure 3:
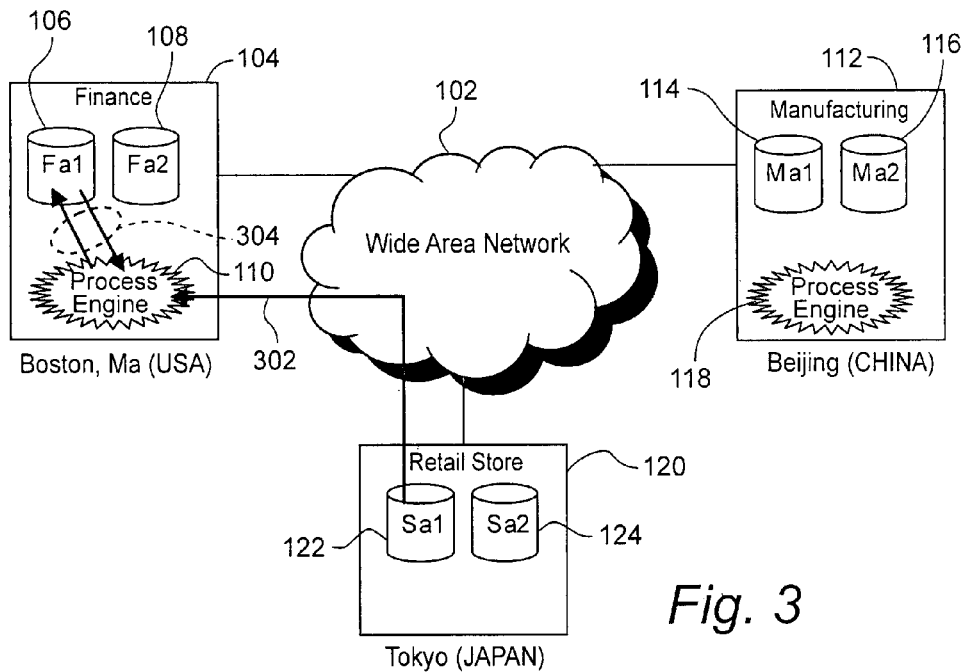
FIGS. 3-5 illustrate some of the network traffic associated with the process of FIG. 2 relevant as a demonstration of the problems associated with typical centralized orchestration engines.
Figure 4:
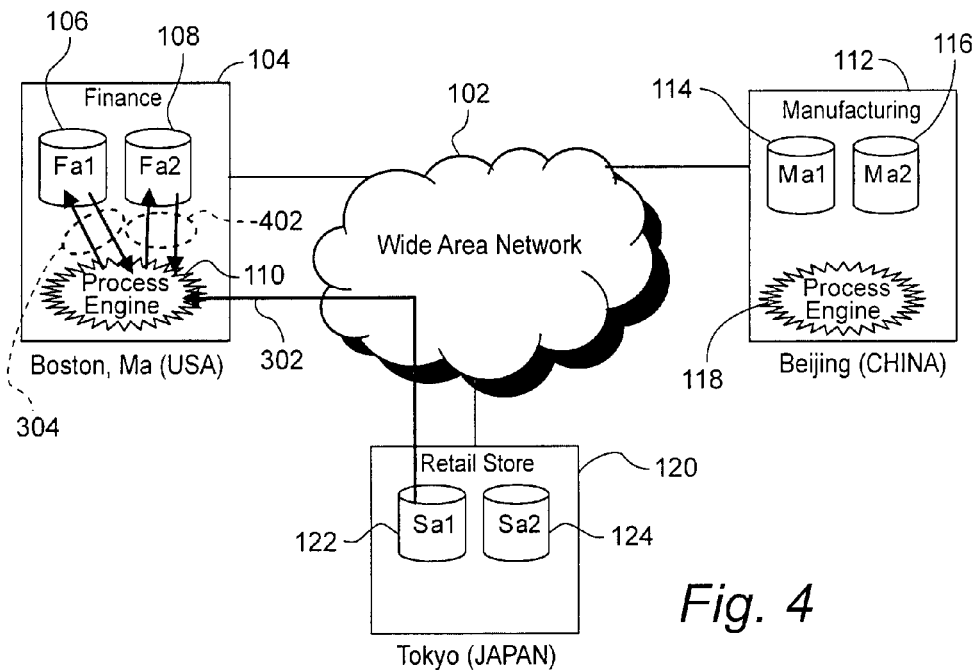
Figure 5:
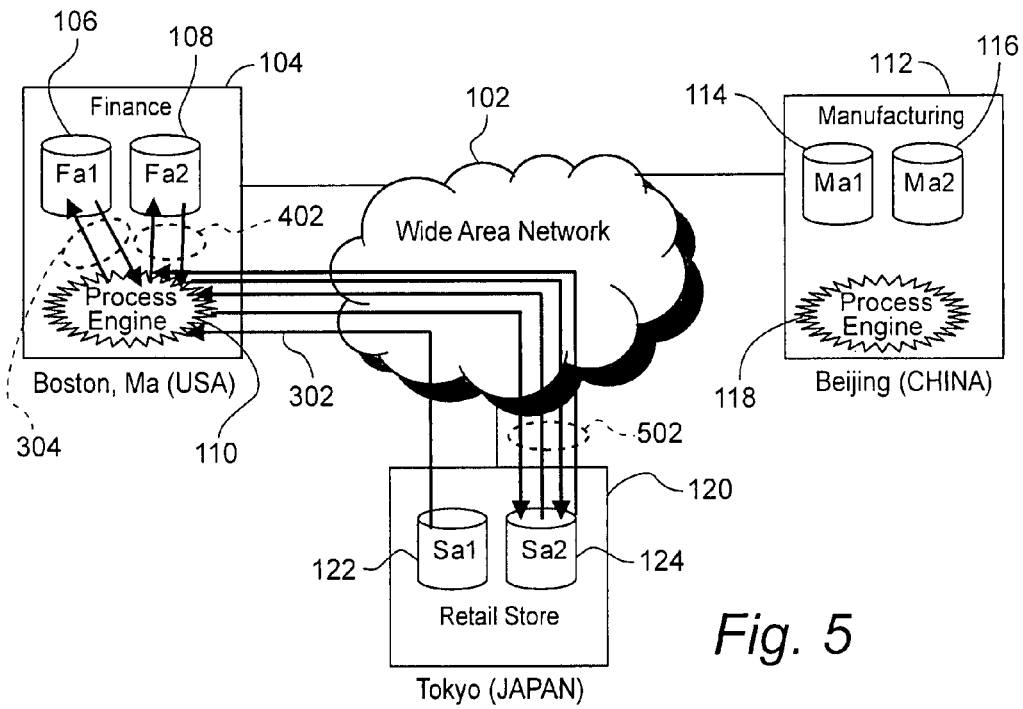

Using such current approaches, this process executes in a non-optimal fashion. This non-optimal process for execution, however, can be used to explain the advantages of the distributed execution techniques of certain example embodiments. Thus, FIGS. 3-5 illustrate some of the network traffic associated with the process of FIG. 2 relevant as a demonstration of the problems associated with typical centralized orchestration engines. As shown in FIG. 3, the retail store location 120 triggers a new process 302 and interacts with the first financial application 106 to check for rebates and then returns to one of the process engines to find out what to do next 304. It is an arbitrary decision on which process engine this process instance will be bound to. In this case, the engine 110 located in the Boston facility is selected by way of example and without limitation. It will be appreciated that the effect of binding a process to either engine in the diagram generally is the same and will become more apparent given the description below.

As shown in FIG. 4, the process then interacts with the second financial application to check for items on sale and then returns to the process engine to find out what to do next 402. The process now has to interact with the second retail application 124 to reconcile the inventory and return to the process engine 110 to find out what to do next 502.

Although the process of FIG. 2 is not yet done, the effect of centralized process execution is readily discernable. In particular, there are a large number of remote connections that must traverse the WAN. It will be appreciated that this approach results in inefficiencies, network congestion, potential ineffectiveness (e.g., because of network problems), and/or technical complexity in network design and BPM provisioning.

By way of contrast with this disadvantageous approach, certain example embodiments provide a BPM product architecture that is organized as an integrated design time and an integrated distributed runtime.

The creation of process models may be a user based activity that is accomplished by either a business user and/or a highly trained IT developer. It will be appreciated that the creation of process models in many cases will be a collaboration of both types of personas. In certain example embodiments, the architecture allows for process model diagrams to be implemented and stored in a repository that is locally managed and optionally backed by a variety of commercially available code management systems.

Design time assets, such as, for example, process model definitions, that adhere to the Business Process Modeling Notation (BPMN) specification, for example, may be transformed into runtime artifacts that can be distributed throughout the enterprise and do not necessarily need to be configured with any location-specific information. Part of the method used to insulate the location of where process steps execute from the BPM Process Engine is enabled by the technology developed to generate these runtime artifacts.

The artifacts that are created make it possible for business processes to execute in a distributed manner. A suitable messaging protocol (e.g., Java Messaging Service (JMS) messaging) provides the communication between the multiple instances of the Process Engines that collectively are responsible for the execution of a process model.

Additionally, implementing a messaging protocol such as JMS and the manner it is used by the Process Engine may increase the reliability and manageability of the system by utilizing message publication and subscription as a part of the core architecture to help with flow control, resource allocation, reliable delivery, and the like.

As compared to the arrangement shown in FIG. 1, distributed execution reduces the hops across the WAN. Using a suitable messaging protocol such as JMS allows for added performance and reliability, as the process can still execute at least fragments of the process in each local geography and also queue transitions between the geographies.

Figure 6:
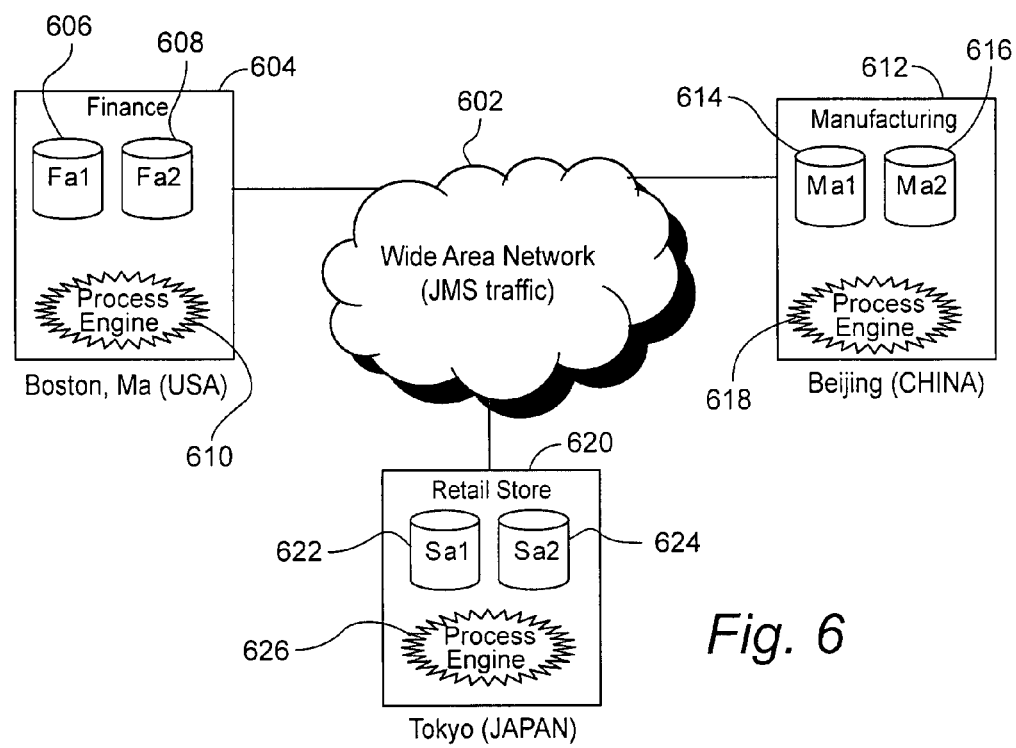
FIG. 6 is an improved network configuration using a distributed orchestration engines resulting in the handling JMS traffic in accordance with an example embodiment.

FIG. 6 is an improved network configuration using a distributed orchestration engines resulting in the handling JMS traffic in accordance with an example embodiment. As will be appreciated from FIG. 6, each facility now includes an instance 610/618/626 of a Process Engine according to certain example embodiments. The WAN 602 is now capable of accommodating JMS traffic.

A detailed discussion of how JMS or any other suitable protocol can be used in connection with certain example embodiments is provided below. In brief, the BPM process engine provides the distributed processing capability by publishing messages that are subscribed to by the appropriate process engine instance in the desired location. JMS or any other suitable protocol may provide the messaging transport layer.

Figure 7:
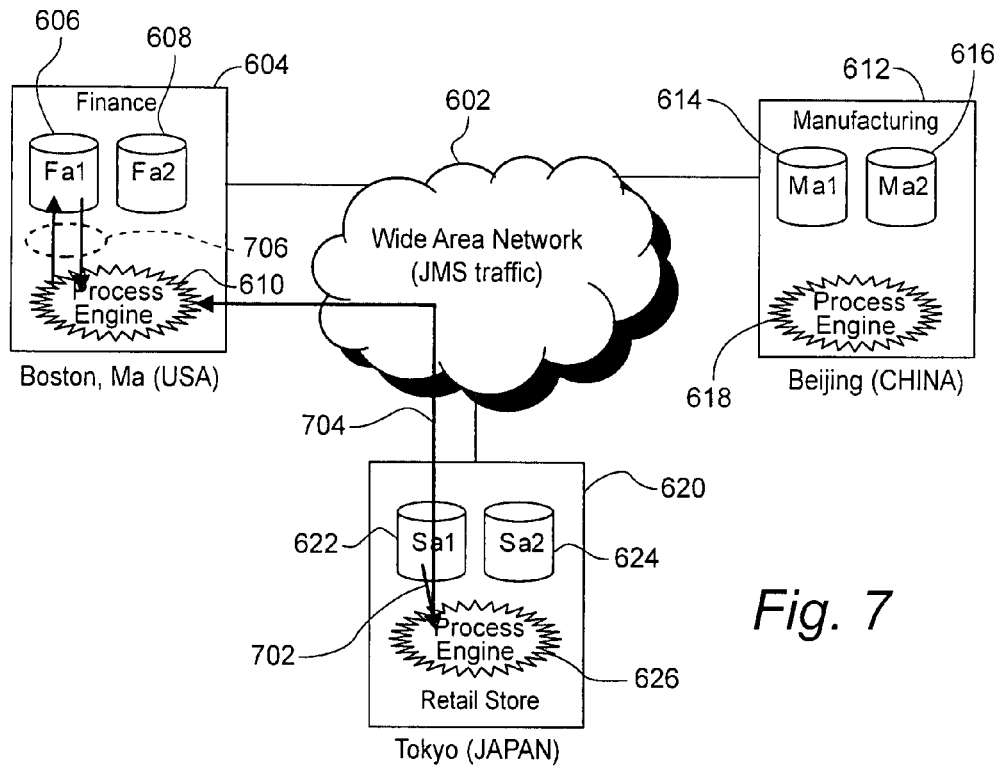
FIGS. 7-9 illustrate some of the network traffic associated with the process of FIG. 2 in accordance with an example embodiment.
Figure 8:
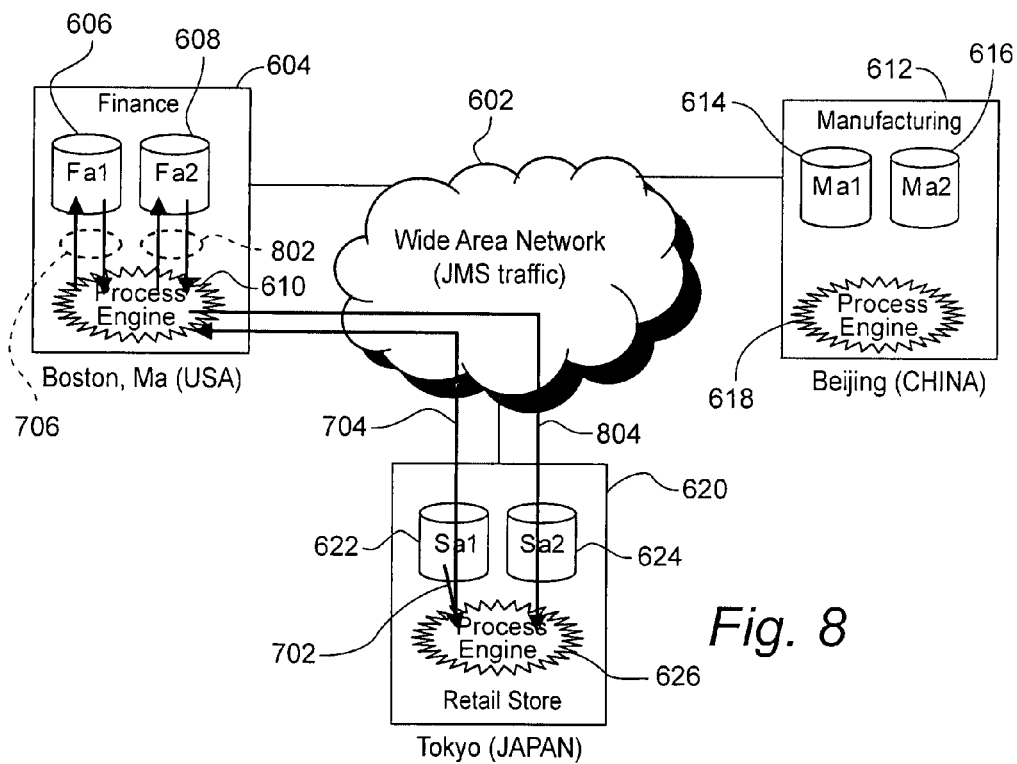
Figure 9:
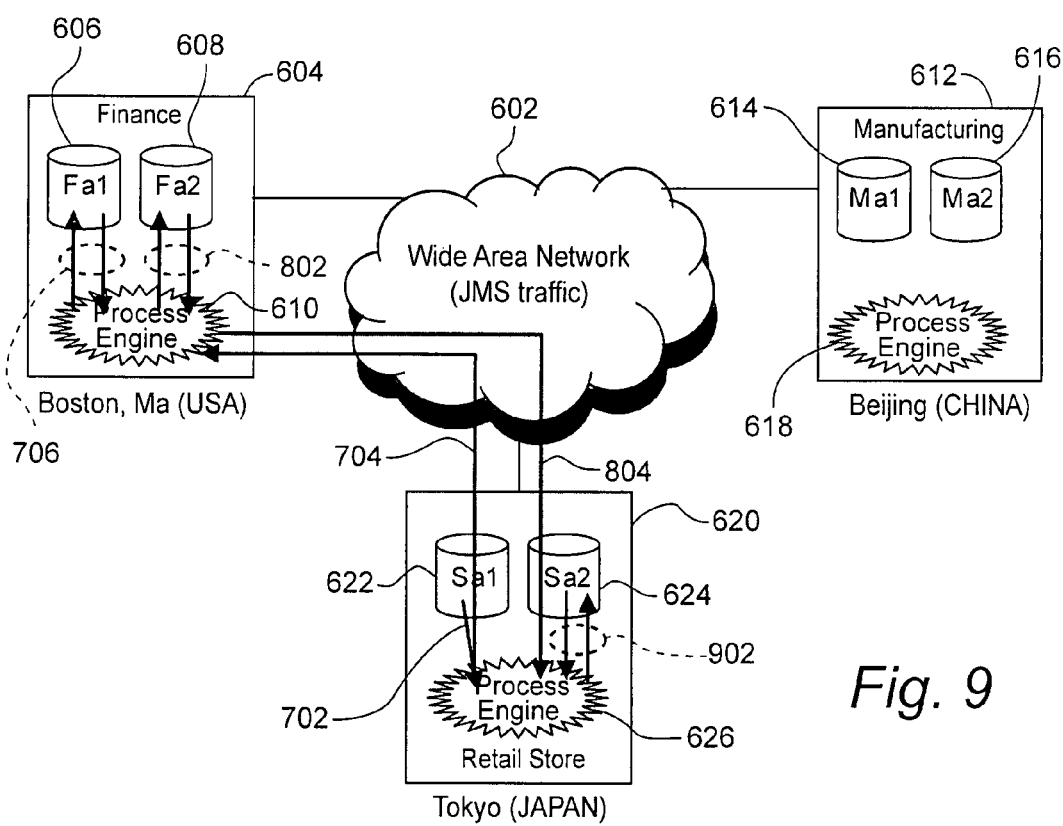

FIGS. 7-9 illustrate some of the network traffic associated with the process of FIG. 2 in accordance with an example embodiment. In FIG. 7, the process is triggered locally 702, and then the process engine 626 publishes a message 704 to interact with the first financial application 606 to check for rebates and returns to the local process engine 610 to determine what to do next 706. The message 706 is subscribed to by the process engine 610 located at the finance location 604 and not by the process engine 618 at the manufacturing location 612 using a technique that helps to provide location transparency. This technique will be discussed in greater detail below.

As is shown in FIG. 8, the process interacts with the second financial application 608 to check for items on sale across the LAN (e.g., within the financial location 604 rather than traversing the WAN 602) and returns to the local process engine 610 to find out what to do next 802, which involves publishing a message 804 that will be received by the process engine 626 which, in turn, will invoke the second sales application 624 to record the sale. In FIG. 9, the process returns 902 to the local process engine 626 to interact with the second sales application 624 to reconcile inventory 902 using the local LAN.

Although the process from FIG. 2 is not yet complete, it will be appreciated that the effect of distributing processing is advantageous. For example, there are far fewer hops across the WAN 602 because there is no binding of the process to any one given process engine. This implies that individual process steps can execute close to the location of the applications they interact with, thus reducing (and sometimes even eliminating) the need to rely extensively on the WAN 602. Furthermore, transitions between steps that interact with applications that are collocated with a process engine often do not require access to the LAN. Thus, it also will be appreciated that fully (or even substantially fully) distributed execution makes more optimal use of an enterprise's infrastructure than a centralized architecture where a process is bound to an engine somewhere in the network.

Figure 10:
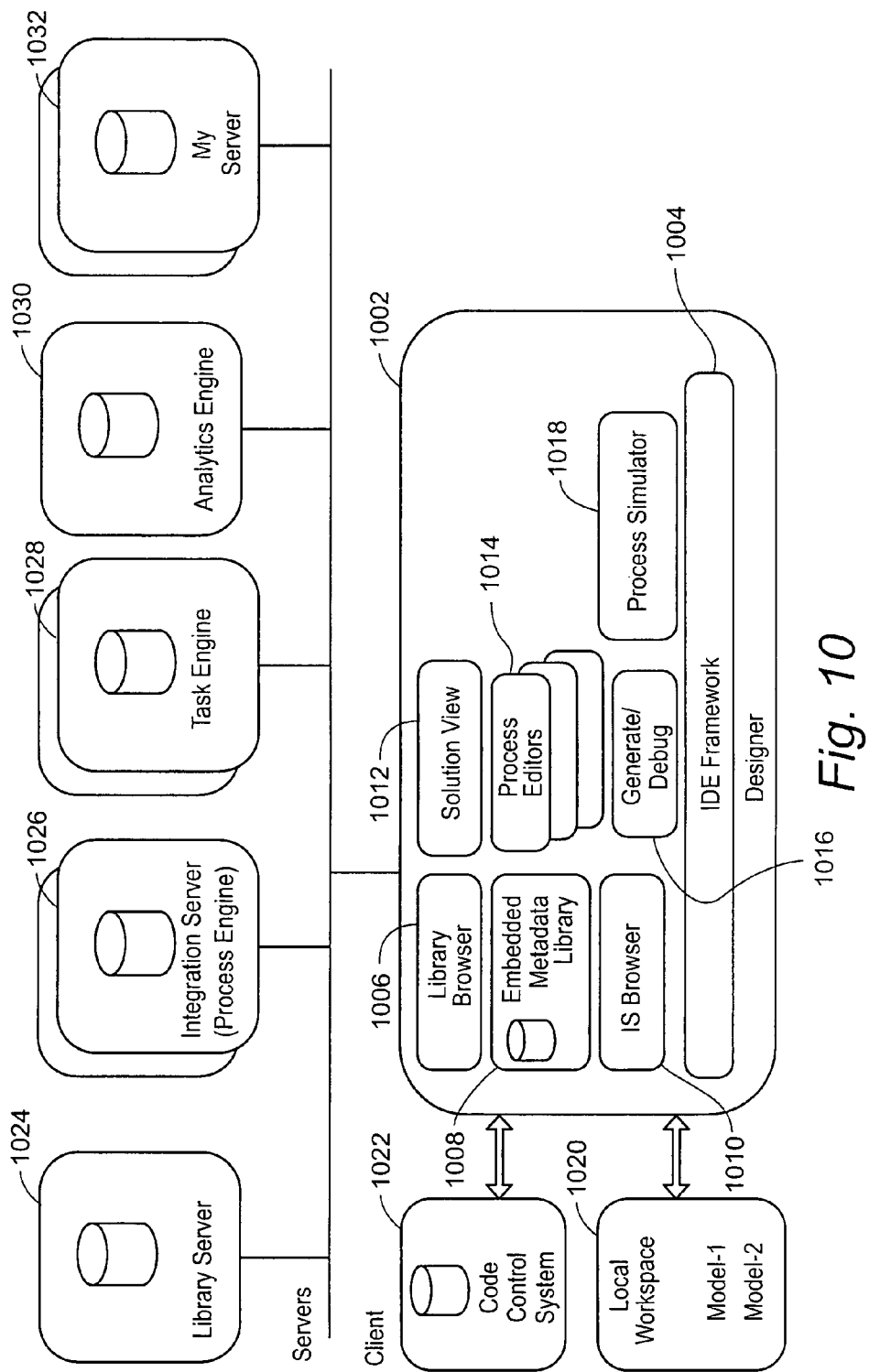
FIG. 10 is a client/server development architecture for enabling location transparent distributed execution in accordance with an example embodiment.

An illustrative technique for enabling location transparent distributed execution will now be provided. FIG. 10 is a client/server development architecture for enabling location transparent distributed execution in accordance with an example embodiment. On the client side, a designer 1002 (e.g., the webMethods Designer or any other suitable collection of tools that supports similar functional capabilities as those outlined below) is provided. One development tool is an Integrated Development Environment (IDE) Framework 1004, where processes may be modeled and implemented. In certain example embodiments, the IDE Framework 1004 may be a commercially available Eclipse-based IDE Framework. At design time, models are stored on the local file system 1020 and optionally checked into a code control system. For example, VCS®, commercially available from Synopsys®, may be used for code control, debugging, and/or other purposes.

A number of other capabilities are optionally provided within the designer tool 1002 on the client side of the development architecture. For example, a library browser 1008 is implemented similar to a Windows Explorer-like tool to look at (e.g., simply list, categorize, etc.) published, shared assets. Similarly, a solution view 1012 (e.g., similar to an Windows Explorer-like interface) is provided to render at least some of the assets in a current project. The embedded metadata library 1008 stores a local copy of all metadata on which the tool operates. As its name implies, the IS browser 1010 is a service browser specifically configured to interact with the Integration Server 1026. Generate/debug module 1016 is a module that converts design time objects to runtime objects, e.g., for simulation, testing purposes, and/or actual deployment purposes. Finally, the process simulator 1018 is a tool that is used to apply attributes to the defined process(es) such that the process ultimately may be simulated prior to any runtime artifacts being generated. In certain example embodiments, a hierarchical integrated process simulation software package such as, for example, SIMPROCESS® (which is commercially available from the CACI Products Company) may be implemented as a part of or in connection with the process simulator 1018. Of course, other process simulation products may be used in connection with certain example embodiments.

As part of this architecture, the assets that exist at design time are used to generate the necessary runtime artifacts that the Process Engine can execute. The Integration Server 1026 is the container for the Process Engine and has a deployment model by which runtime assets are included in a package. A package is a unit of deployment that encapsulates, for example, all of the services, data models, files, properties, and/or configuration parameters that become an executable image of the process model. In brief, the Integration Server is a service-oriented server, capable of implementation across multiple instances, with each instance potentially being located on a different physical server. Thus, the Integration Server 1026 is also configured to execute multiple instances of the Process Engine.

A number of other types of servers optionally may be provided on the server side of the development architecture. For example, the task engine 1028 is a human activity management system, similar to a mail server, configured to send notices, reminders, and/or provide tasks for users to execute.

My Server 1032 is a portal that provides a user interface and applications for administering the system. In certain example embodiments, My Server 1032 may be a "My webMethods Server" of the type commercially available from Software AG. In certain example embodiments, the library server 1024 and analytics engine 1030 also may be of the type commercially available from Software AG.

A business user who defines a process model need not necessary be concerned with the location of where or how the model will be executed. Rather, in certain example embodiments, simply defining the activities in the process along with associating a logical server to the steps is all that is needed.

Figure 11:
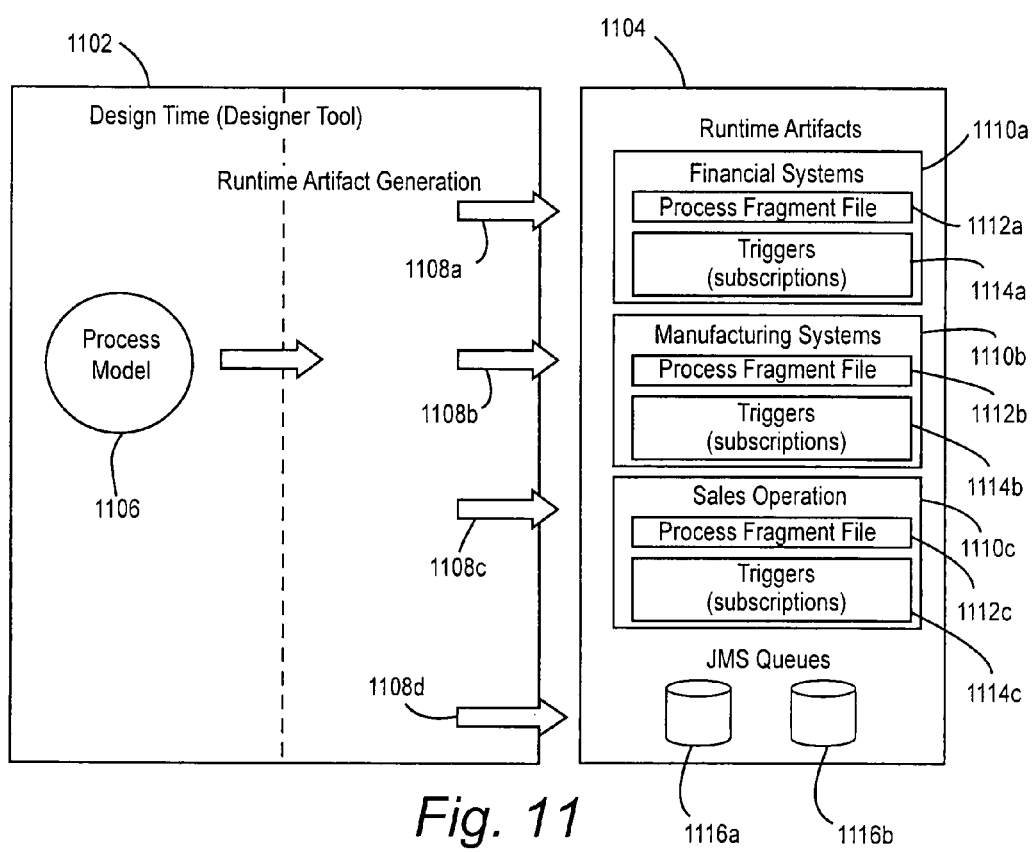
FIG. 11 is a simplified representation of generating runtime artifacts for abstraction that supports fully distributed execution with the ability to insulate the location of where a process executes.

Usually, a BPM process deployment is a collaborative effort between an IT developer and a business user. Certain example embodiments, however, include a layer of abstraction to support fully distributed execution with the ability to insulate the location of where a process executes from both the perspective of the model and from the perspective of the Process Engine. FIG. 11 is a simplified representation of this process.

The representation in FIG. 11 includes design time steps 1102 and runtime steps 1104. The functionality begins at design time with the definition of the model 1006. A process author will define attributes for the model known as logical servers, which are common names for how process steps can be grouped together such that, at deployment time, the necessary executable artifacts needed by the process engine may be generated. Given the example above, the author may have organized its logical servers into three groups, named "Financial Systems," "Manufacturing Systems," and "Sales Operation." The author would then assign each step one of the logical server names so as to group activities together. In this example, it would make sense to assign each step depicted within a given swim-lane in FIG. 2 to the same logical server.

Runtime artifacts 1108a-d may then be generated from the design time model. During the generation phase, the design time model is transformed into a set of services, triggers 1114a-c, and a process fragment file 1112a-c (e.g., an XML file that, as will be described in greater detail below, includes the definitions of only those process model constructs that have been assigned to a specific logical server) that defines all of the process steps that have been grouped into a logical server by a process author. In this example process model where three logical servers have been defined, three packages 1110a-c would be created. These packages 1110a-c (or units of executable logic) are then stored directly on the Process Engine. In addition, the generation phase will create two JMS queues 1116a-b on the JMS message provider, one for processing messages that trigger new process instances 1116a and one queue for handling the transitions between process steps of the model 1116b.

Figure 12:
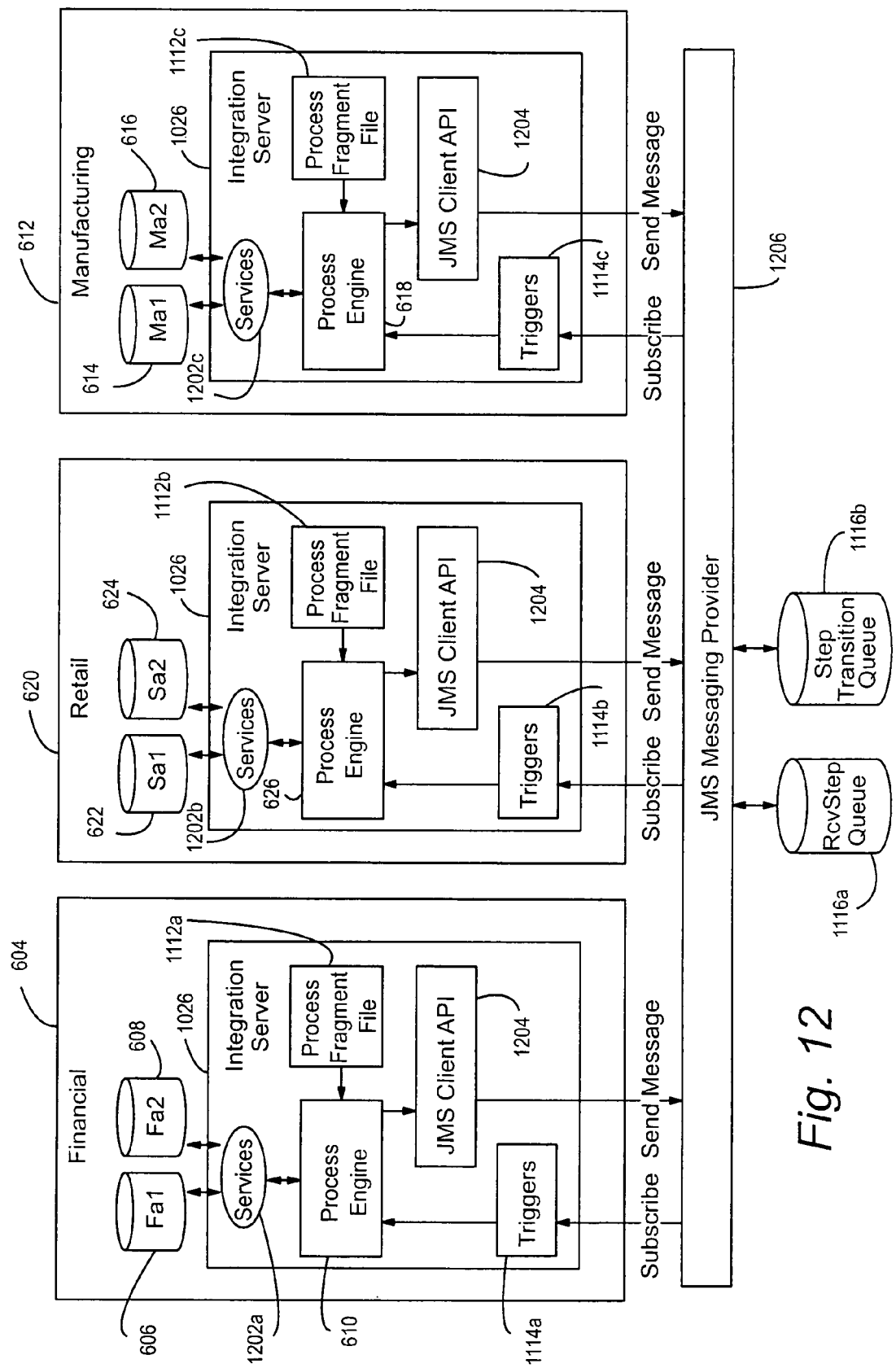
FIG. 12 is an illustrative interaction model in which JMS messaging is used for process orchestration step transitions in accordance with an example embodiment.

JMS messaging, or any other suitable messaging protocol, may be used for process orchestration step transitions. FIG. 12 is an illustrative interaction model in which JMS messaging is used for process orchestration step transitions in accordance with an example embodiment. As each package is generated, the contents necessary to describe those steps that are assigned to the same logical server are then deployed to one or more physical servers and stored as runtime assets in the runtime repository of the Integration Server 1026. The Process Engine will load these assets into memory when needed.

The process fragment file 1112a-c is a portion of the entire process definition defined by the design time modeling tool. A process fragment file 1112a-c may include the definitions of only those process model constructs that have been assigned to a specific logical server. The trigger components 1114a-c may be responsible for subscribing to specific JMS messages that should be routed to the Process Engines 610/626/618 that are installed on the current Integration Server 1026. Triggers 1114a-c may perform the necessary filtering of JMS messages that are published to the JMS messaging layer 1206.

Further details of the message flow will now be provided. The Process Engine publishes messages called Process Transition Documents (PTDs) between process steps that are subscribed to by the trigger components 1114 generated for the model. As each step in the model is executed and completed, a new PTD is published to trigger the next step in the model to be executed. For example, briefly returning to FIG. 2, the "Check For Rebates" process step 210 will start when the previous "Purchase" step 208 has published a PTD as a JMS message. Once the "Check For Rebates" step 210 has completed, it will then publish a PTD to start the next step, which is the "Check for Items on Sale" step 212. This pattern of message flows will continue until the process has reached the end of its execution.

Figure 13:
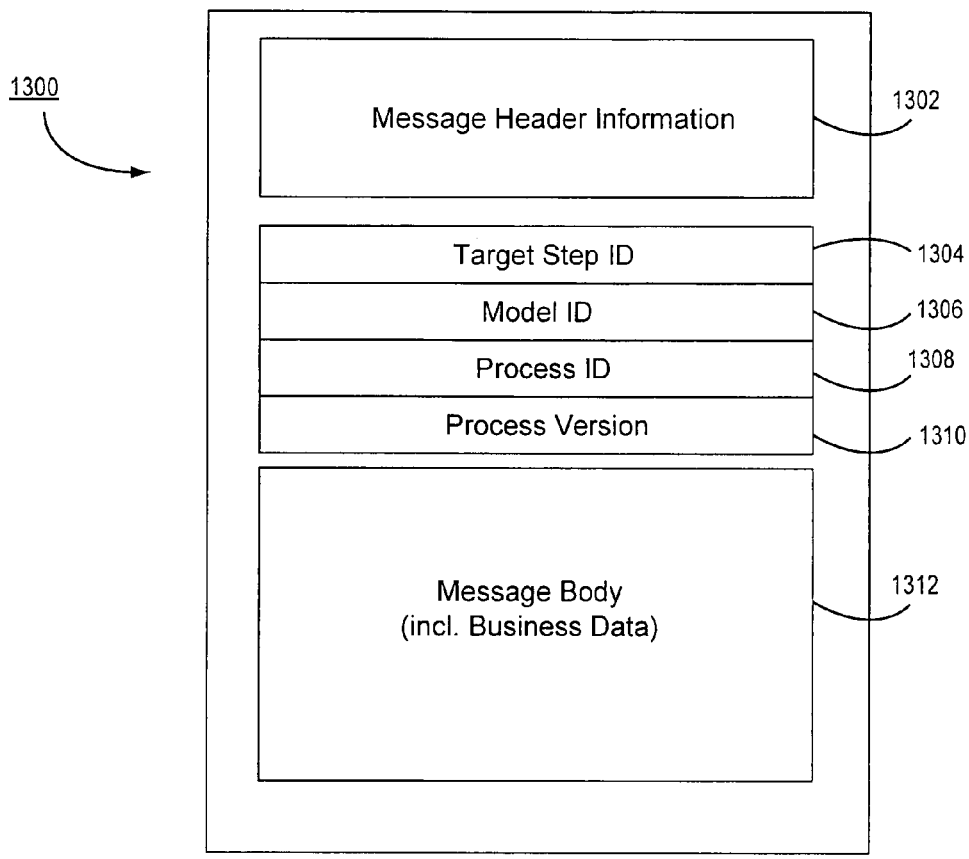
FIG. 13 illustrates the basic message structure of certain example embodiments.

FIG. 13 illustrates the basic message structure of certain example embodiments. As shown in FIG. 13, a PTD includes a header 1302, message properties 1304/1306/1308/1310, and a message body 1312. The message properties may include, for example, a Target Step ID 1304, a Model ID 1306, a Process ID 1308, and a Process Version 1310. The Process Engine may use these message properties to provide location transparent routing and step execution capabilities. At runtime, these PTD message properties may be populated by the Process Engine such that, in a distributed execution environment, the routing data needed to route the messages is part of the message itself. Additionally, any business data that a process model might need to pass to the next step in a process model may be carried in the message body 1312 of the message.

Figure 14:
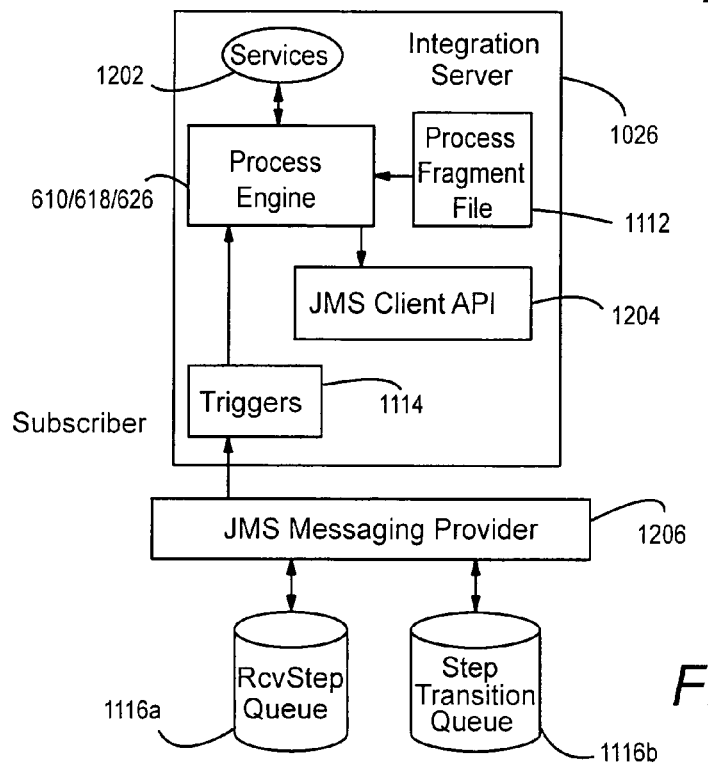
FIG. 14 illustrates the use of triggers, filtering, and expressions within an instance of the Integration Server, in accordance with an example embodiment.

FIG. 14 illustrates the use of triggers, filtering, and expressions within an instance of the Integration Server, in accordance with an example embodiment. In general, triggers 1114 are facilities that are part of the core Integration Server 1026 and are used by the Process Engine. A trigger 1114 is used to define a subscription to a message and to define what service should execute if a message that matches the subscription is published to the JMS message layer 1206. Triggers 1114 are used by the BPM runtime to define a subscription to a PTD.

Expressions are defined for a trigger 1114 and use the message properties that are populated as JMS message properties. These expressions are then used as a filter for specific messages that are published by the Process Engine to a queue (e.g., a JMS queue). The filters 1114 may be constructed using the following illustrative property values: Target Step ID, Model ID, Process Instance ID, and Model Version. The filtering of messages enables the instance 610/618/626 of the Process Engine to receive only messages that are destined to invoke process steps that are contained in the process fragment file 1112a-c that has been deployed to a specific Process Engine instance 610/618/626.

Figure 15:
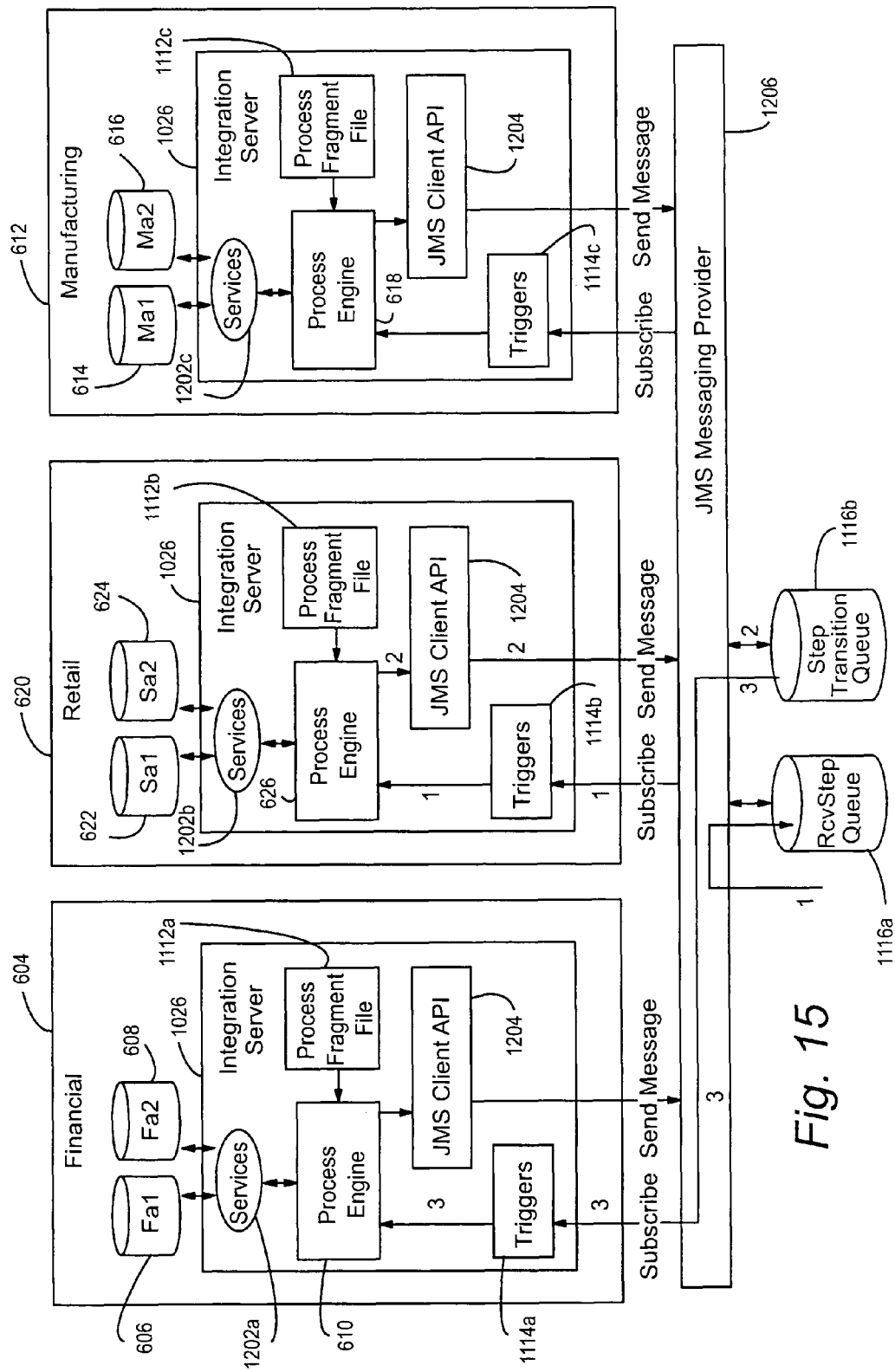
FIG. 15 shows the process of FIG. 2 being executed using the interaction model of FIG. 12 in accordance with an example embodiment.

FIG. 15 shows the process of FIG. 2 being executed using the interaction model of FIG. 12 in accordance with an example embodiment. In this way, JMS messaging may be used for process orchestration step transitions. Returning now to the example process of FIG. 2, a process is triggered at the retail location 620 and the "Purchase" process step 208 executes and interacts with the first retail application 622. This will occur when a user or an external application publishes a message to the correct Receive Step Queue 1116a created for this process model. The trigger generated has a subscription for the specific message type that has been placed in the queue and uses the message's common name as a filter so that the step associated with the receipt of the message will be located in the process fragment file 1112b and then executed. In this case the "Purchase" step 208 will be executed as it is the first step in the model. Thus, the messages associated with this step are designated by a "1" in FIG. 15.

Next, after the "Purchase" step 208 has completed execution, the Process Engine 626 will publish a Process Transition Document (PTD) to the correct queue 1116b to handle step transitions. At the time a step publishes a PTD message, it may add certain message properties to the message that can be used for routing the message to an instance 610/618/626 of the Process Engine that has the definition of the next step in the process to execute. These properties may include, for example, Model ID, Target Step ID, Process Instance ID, and Process Version (e.g., as shown and described in FIG. 13).

The trigger 1114a deployed to the Integration Server 1026 in the financial location 604 has a subscription for a Process Transition Document. However, to facilitate subscribing to the correct PTD message, the trigger 1114a executes a filter on the message's properties and uses, for example, Model ID, Target Step ID, Process Instance ID, and Process Version to route the message and correlate it to an existing process instance. The process engine 610 will then locate the step definition from the process fragment file 1112a to determine which step to execute. In this case, the step that matches the Target Step ID in the received message is the "Check for Rebates" process step 210, which interacts with the first financial application 606.

Although the process of FIG. 2 is not yet complete, the queuing and publish-subscribe techniques of certain example embodiments will be understood from the foregoing description.

Figure 16:
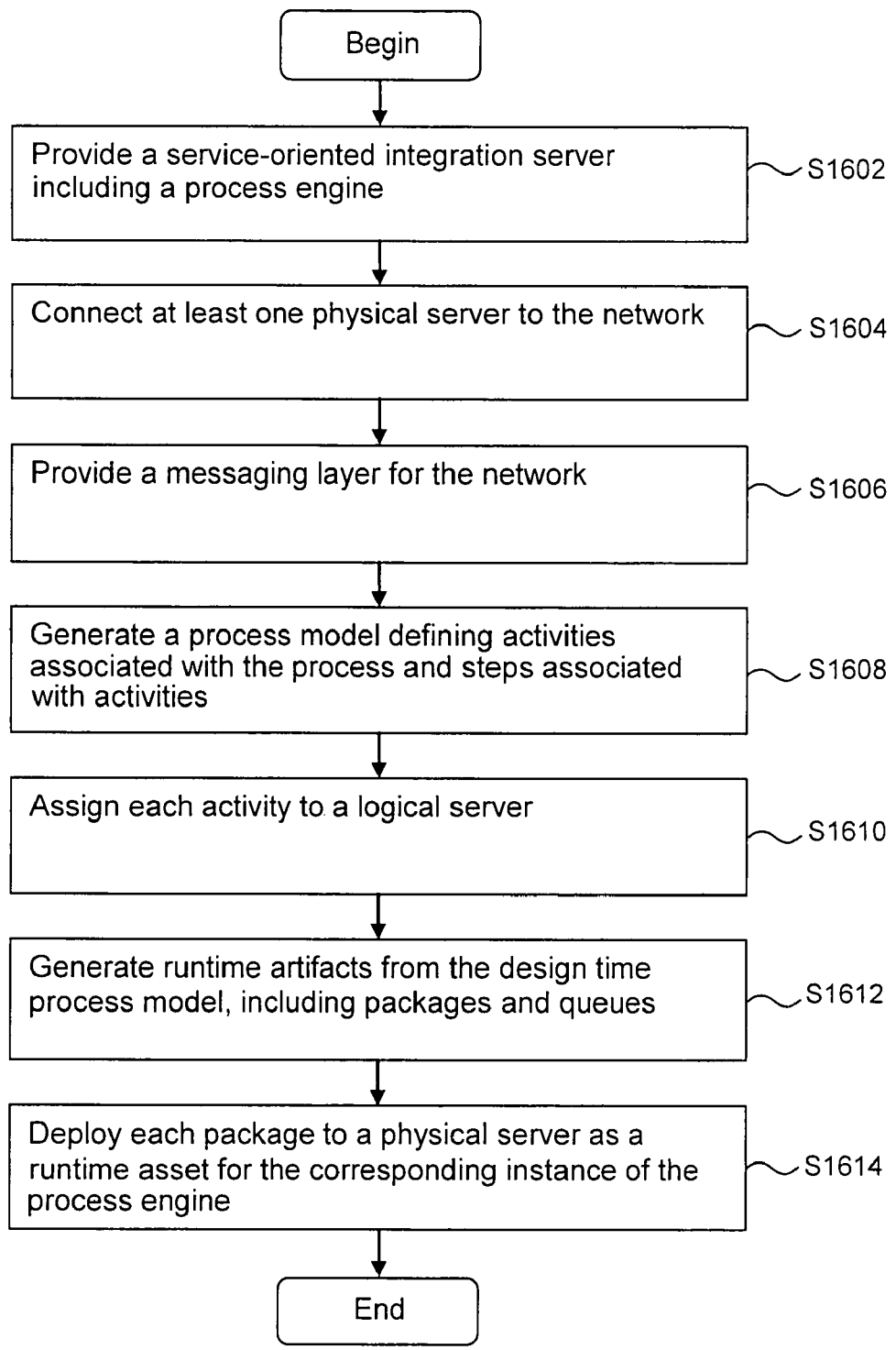
FIG. 16 is an illustrative flowchart showing a method of configuring a network in accordance with an example embodiment; and, FIG. 17 is an illustrative flowchart showing a method of operating a network in accordance with an example embodiment.

Extrapolating from the above specific examples of network configuration and operation techniques, FIG. 16 is an illustrative flowchart showing a method of configuring a network in accordance with an example embodiment. In certain example embodiments according to FIG. 16, a method of configuring a network is provided. A service-oriented integration server including a process engine is provided (step S1602). At least one physical server is connected to the network (step S1604). Each said physical server includes an instance of the integration server, and each said instance of the integration server includes an instance of the process engine. A messaging layer for use with the network is provided (step S1606). At design time, a process is modeled so as to generate a process model (step S1608), with the process model defining at least one activity associated with the process and at least one step associated with each said activity; and each said activity is assigned to a logical server such that, at deployment time, any executable artifacts needed by an instance of the process engine are generatable (step S1610). Runtime artifacts are generated from the design time process model (S1612). This process includes the steps of generating at least one package from the design time process model, with each said package corresponding to one said logical server and including at least one trigger and a process fragment file, each said trigger being responsible for subscribing to process transition document messages to be routed to the instance of the process engine installed on the corresponding instance of the integration server and for filtering process transition document messages published to the messaging layer, the process fragment file defining only those process steps that are associated with the corresponding logical server; and creating two queues on the messaging layer, with a first queue to process messages that trigger new process instances and a second queue to accommodate transitions between process steps of the process model. Each said package is deployed to a physical server. The package is deployed as a runtime asset for the corresponding instance of the process engine (step S1614). The process transition document messages are published by the process engine, with each said process transition document message including routing data as a part of the message itself for routing the message. Thus, the process engine is configured to provide location transparent routing and process execution via process transition document subscription and filtering.

Figure 17:
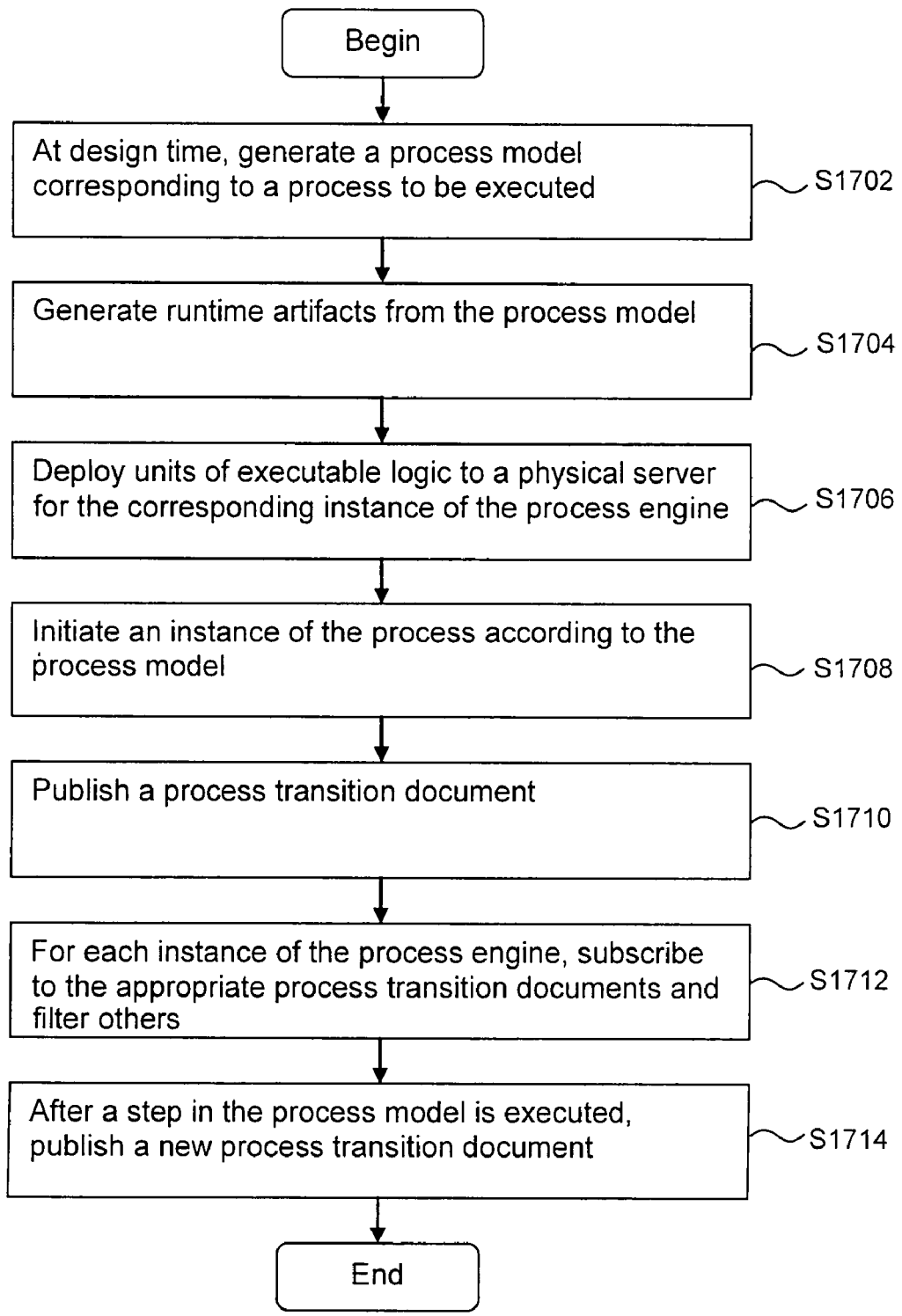

FIG. 17 is an illustrative flowchart showing a method of operating a network in accordance with an example embodiment. In certain example embodiments according to FIG. 17, there is provided a method of operating a network including at least one physical server and a messaging layer, with each said physical server including an instance of a service-oriented integration server provided to the network, and each said instance of the integration server including an instance of a process engine. At design time, a process model corresponding to a process to be executed is generated (step S1702). The process model includes at least one activity associated with the process and at least one step associated with each said activity. Runtime artifacts are generated from the process model (step S1704). The runtime artifacts comprise at least one deployable unit of executable logic for execution on a corresponding instance of the process engine, a first queue to process transition documents that trigger new process instances, and a second queue to accommodate transitions between steps of the process model. Each unit of executable logic is deployed to a physical server as a runtime asset for the corresponding instance of the process engine (step S1706). An instance of the process is initiated according to the process model (step S1708). A process transition document is published (step S1710). The process transition document is populated by the process engine with routing data as a part of the message itself for routing the message. Each instance of the process engine subscribes to the process transition documents to be routed to the corresponding instance of the process engine installed on the corresponding instance of the integration server and filters other process transition documents published to the messaging layer (step S1712). After a step in the process model is executed, a new process transition document is published to cause a next step in the process model to be executed (step S1714). In this way, the process is routed and executed in a location transparent manner.

Given the above-described techniques, it will be appreciated that certain example embodiments are capable of providing a number of corresponding advantages. For example, the BPM Process Engine supports a business process being executed in a distributed fashion, while the location of where the process steps are executed is insulated from the Process Engine as enabled, for example, by a JMS messaging architecture. Also, given the nature of the architecture, neither the person authoring a business process in the designer modeling tool nor the Process Engine itself necessarily needs to have specific knowledge about the location of where the steps of a business process are executed. Similarly, the author of a business process does not necessarily need to have any knowledge of the physical infrastructure of the resources employed by the enterprise.

Because there is no binding of a process to a specific process orchestration engine, the execution of steps may be distributed throughout the enterprise. Business processes tend to execute more efficiently in a distributed execution environment as compared to a single location that manages their state. This is especially true if an enterprise is global and has a decentralized computing environment because of the reduced potential for dependency on wide area networking. Furthermore, the architecture may be significantly horizontally scalable and easy to manage. Generally, all that is required to increase processing capacity is to replicate the generated process artifacts onto additional CPUs, which can be accomplished while the system is running and does not require any changes to process models at design time.

Using JMS messaging also may increase the reliability of the architecture by providing distributed queuing support that tends to help buffer unplanned changes to the volume of data that is processed. Furthermore, queuing process step transitions tends to improve reliability by allowing the system to continue processing data locally in the event that connectivity or unplanned resource outages occur. Thus, when these situations have been resolved, business processes may automatically resume execution without data loss.

In certain example embodiments, the integration server may be a webMethods Integration Server of the type commercially available from Software AG. However, the present invention is not limited to this or any particular implementation of an integration server. In particular, any suitably configured integration server may be used in connection with the example embodiments described herein. It will be appreciated that in such cases, it may be necessary to adjust the artifact generation techniques accordingly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of configuring a network, the method comprising:
    providing a service-oriented integration server including a process engine;
    connecting to the network at least one physical server, each said physical server including an instance of the integration server, each said instance of the integration server including an instance of the process engine;
    providing a messaging layer for use with the network;
    at design time:
        modeling a process so as to generate a process model, the process model defining a plurality of activities associated with the process and at least one step associated with each said activity, and
        assigning each step from the plurality of activities to a plurality of logical servers, that are defined independent of physical servers, such that, at deployment time, any executable artifacts needed by an instance of the process engine are generatable;
    generating runtime artifacts from the design time process model, said runtime artifact generation comprising:
        generating, for each one of the plurality of logical servers, at least one package from the design time process model, each said package including at least one trigger and a process fragment file, each said trigger being responsible for subscribing to process transition document messages to be routed to the instance of the process engine installed on the corresponding instance of the integration server and for filtering process transition document messages published to the messaging layer, the process fragment file defining only those process steps that are associated with the corresponding logical server, and
        creating two queues on the messaging layer, a first queue to process messages that trigger new process instances and a second queue to accommodate transitions between process steps of the process model; and
    deploying each said package to a physical server, the package being deployed as a runtime asset for the corresponding instance of the process engine,
    wherein the process transition document messages are published by the process engine, each said process transition document message including routing data as a part of the message itself for routing the message, and
    wherein the process engine is configured to provide both location transparent: 1) execution of the process model such that the process model and each one of the steps within the process model are executed in a transparent manner with respect to the deployed location of each one of the packages that contain at least one of the plurality of steps; and 2) routing, via process transition document subscription and filtering.

2. The method of claim 1, wherein the process is a business process that is defined in Business Process Modeling Notation.

3. The method of claim 1, further comprising including in each said process transition document message a header, message properties, and a message body.

4. The method of claim 3, further comprising including in the message properties a target step identifier, a model identifier, a process identifier, and a process version.

5. The method of claim 3, further comprising including in the message body business data to be passed to a subsequent step in the process model.

6. The method of claim 1, further comprising configuring the messaging layer to support JMS messaging, and
    wherein each said process transition document message is a JMS message.

7. The method of claim 1, further comprising, after a step in the process model is executed, publishing a new process transition document message to cause the next step in the process model to be executed.

8. The method of claim 1, further comprising, at runtime, populating the process transition document messages with routing data via the process engine.

9. The method of claim 1, further comprising avoiding any lifecycle bindings of a process instance to a particular process engine instance.

10. The method of claim 1, wherein the assigning at design time is performed with respect to a logical server, and not a physical server, such that a priori knowledge of a topology of the network is unnecessary.

11. The method of claim 1, wherein each said logical server represents a grouping of process steps associated with the process model generateable without reference to, and independent of, the at least one physical server.

12. A method of operating a network including at least one physical server and a messaging layer, each said physical server including an instance of a service-oriented integration server provided to the network, each said instance of the integration server including an instance of a process engine, the method comprising:
    at design time, generating a process model corresponding to a process to be executed, the process model including a plurality of activities associated with the process and at least one step associated with each said activity;
    assigning each one of the steps from the plurality of activities to a plurality of logical servers at design time;

generating, for each one of the plurality of logical servers with associated steps, runtime artifacts from the process model, said runtime artifacts comprising at least one deployable unit of executable logic for execution on a corresponding instance of the process, engine;

creating a first queue to process transition documents that trigger new process instances, and a second queue to accommodate transitions between steps of the process model;

deploying each unit of executable logic to a physical server as a runtime asset for the corresponding instance of the process engine;

initiating an instance of the process according to the process model;

publishing a process transition document, the process transition document being populated by the process engine with routing data as a part of the message itself for routing the message;

for each instance of the process engine, subscribing to the process transition documents to be routed to the corresponding instance of the process engine installed on the corresponding instance of the integration server and filtering other process transition documents published to the messaging layer; and, after a step in the process model is executed, publishing a new process transition document to cause a next step in the process model to be executed, wherein the process is routed and executed in a location transparent manner such that the process model and each one of the steps within the process model are executed in a transparent manner with respect to the deployed physical of each one of the unit of executable logic that contain at least one of the plurality of steps.

13. The method of claim 12, wherein the process is a business process.

14. The method of claim 12, further comprising including in each said process transition document a header, message properties, and a message body.

15. The method of claim 14, further comprising including in the message properties a target step identifier, a model identifier, a process identifier, and a process version.

16. The method of claim 14, further comprising including in the message body business data to be passed to a subsequent step in the process model.

17. The method of claim 12, wherein the messaging layer is a JMS messaging layer, and
wherein each said process transition document is a JMS message.

18. The method of claim 12, further comprising, avoiding any lifecycle bindings of a process instance to a particular process engine.

19. The method of claim 12, wherein at design time, the at least one step is assigned to at least one logical server, and not to the at least one physical server, such that a priori knowledge of a topology of the network is unnecessary.

20. The method of claim 19, wherein each said logical server represents a grouping of process steps associated with the process model generateable without reference to, and independent of, the at least one physical server.

21. A computer-mediated network, comprising:
a service-oriented integration server including a process engine configured to provide location transparent distributed execution of a process conforming to a user-defined process model, the user-defined process model defining a plurality of activities associated with the process and at least one step associated with each said activity;
a messaging layer for the network; and,
at least one physical server, each said physical server including an instance of the integration server, wherein each said instance of the integration server includes:
an instance of the process engine,
runtime artifacts generated at design time based on the design time process model,
including:
at least one package, each said package corresponding to logical grouping of one or more steps of the plurality of activities, and
two queues provided for the messaging layer, a first queue to process messages that trigger new process instances and a second queue to accommodate transitions between process steps of the process model,
at least one trigger each said trigger being responsible for subscribing to process transition document messages to be routed to the instance of the process engine installed on the corresponding instance of the integration server and for filtering process transition document messages published to the messaging layer, and
a process fragment file, the process fragment file defining only those steps of the user defined process model that are associated with a corresponding logical grouping;
wherein the process transition document messages are published by the process engine, each said process transition document message including routing data as a part of the message itself for routing the message,
wherein the process engine is configured to provide location transparent execution of the process model such that the process model and each one of the steps within the process model are executed in a transparent manner with respect a physical network topology that includes the at least one physical server.

22. The network of claim 21, wherein the process is a business process.

23. The network of claim 21, wherein each said process transition document message includes a header, message properties, and a message body.

24. The network of claim 23, wherein the message properties include a target step identifier, a model identifier, a process identifier, and a process version.

25. The network of claim 23, wherein included in the message body is business data to be passed to a subsequent step in the process model.

26. The network of claim 21, wherein the messaging layer is a JMS messaging layer, and wherein each said process transition document messages is a JMS messages.

27. The network of claim 21, wherein, after a step in the process model is executed, the process engine is configured to publish a new process transition document message to cause the next step in the process model to be executed.

28. The network of claim 21, wherein the process model conforms to Business Process Modeling Notation.

29. The computer-mediated network of claim 21, wherein at design time, the at least one step is assigned to at least one logical server, and not to the at least one physical server, such that a priori knowledge of a topology of the network is unnecessary.

30. The computer-mediated network of claim 21, wherein each said logical server represents a grouping of process steps associated with the process model generateable without reference to, and independent of, the at least one physical server.

31. A non-transitory computer readable storage medium storing a process engine for use across instances of a service-oriented integration server provided to a network having a messaging layer, the process engine being configured to execute a process in accordance with a process model defined at design time so as to include a plurality of activities associated with the process and at least one step associated with each said activity, each one of the steps of the plurality of activities assigned among a plurality of logical servers, each instance of the process engine comprising:

runtime artifacts generated from the process model that correspond to a deployable unit of executable logic for execution on the instance of the process engine;

a publishing service configured to publish a process transition document, the process transition document being populated by the process engine with routing data as a part of the message itself for routing the message;

a subscription service configured to subscribe to the process transition documents to be routed to the corresponding instance of the process engine installed on the corresponding instance of the integration server;

a filtering service configured to filter other process transition documents published to the messaging layer;

wherein the messaging layer includes two queues generated from the design time process model, including a first queue to process transition documents that trigger new process instances, and a second queue to accommodate transitions between steps of the process model, wherein, after a step in the process model is executed, the publishing service is configured to publish a new process transition document to cause a next step in the process model to be executed independent of a physical location of where the next step is to be executed, and wherein the process is routed and executed in a location transparent manner such that the process model and each one of the plurality of steps within the process model are executed in a transparent manner with respect to the process engine.

32. The computer readable storage medium of claim 31, wherein the process is a business process.

33. The computer readable storage medium of claim 31, wherein a header, message properties, and a message body are included in each said process transition document.

34. The computer readable storage medium of claim 33, wherein a target step identifier, a model identifier, a process identifier, and a process version, are included in the message properties.

35. The computer readable storage medium of claim 33, wherein business data to be passed to a subsequent step in the process model is included in the message body.

36. The computer readable storage medium of claim 31, wherein the messaging layer is a JMS messaging layer, and wherein the process transition documents are JMS messages.

37. The computer readable storage medium of claim 31, wherein the process engine operates free from any lifecycle bindings of a process instance to a particular process engine instance.

38. The computer readable storage medium of claim 31, wherein the process model conforms to Business Process Modeling Notation.

39. The non-transitory computer readable storage medium of claim 31, wherein at design time, the at least one step is assigned to at least one logical server, and not to at least one physical server, such that a priori knowledge of a topology of the network is unnecessary.

40. The non-transitory computer readable storage medium of claim 39, wherein each said logical server represents a grouping of process steps associated with the process model generateable without reference to, and independent of, the at least one physical server.

* * * * *